H. C. AYERST.
REFRIGERATING SYSTEM FOR CARS.
APPLICATION FILED FEB. 9, 1914.

1,174,800.

Patented Mar. 7, 1916.
8 SHEETS—SHEET 1.

WITNESSES:

INVENTOR
Harry C. Ayerst.
BY
ATTORNEY

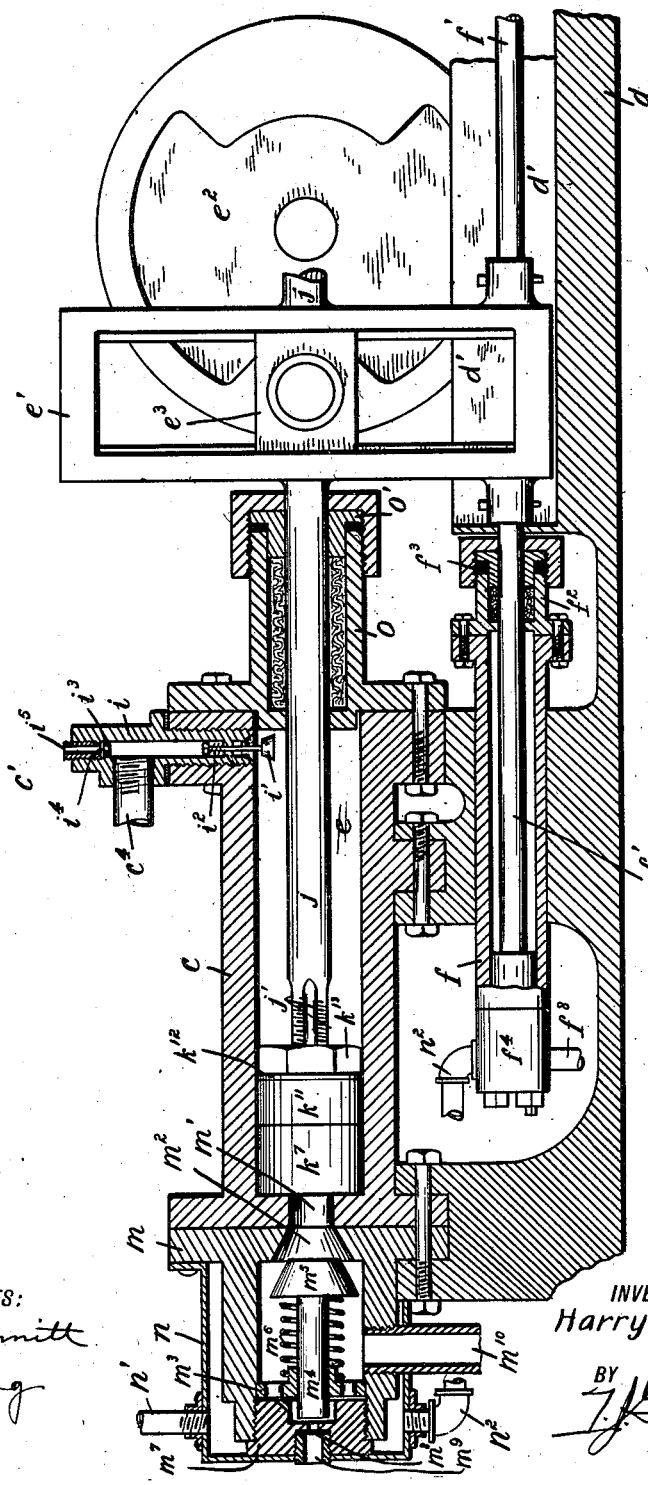

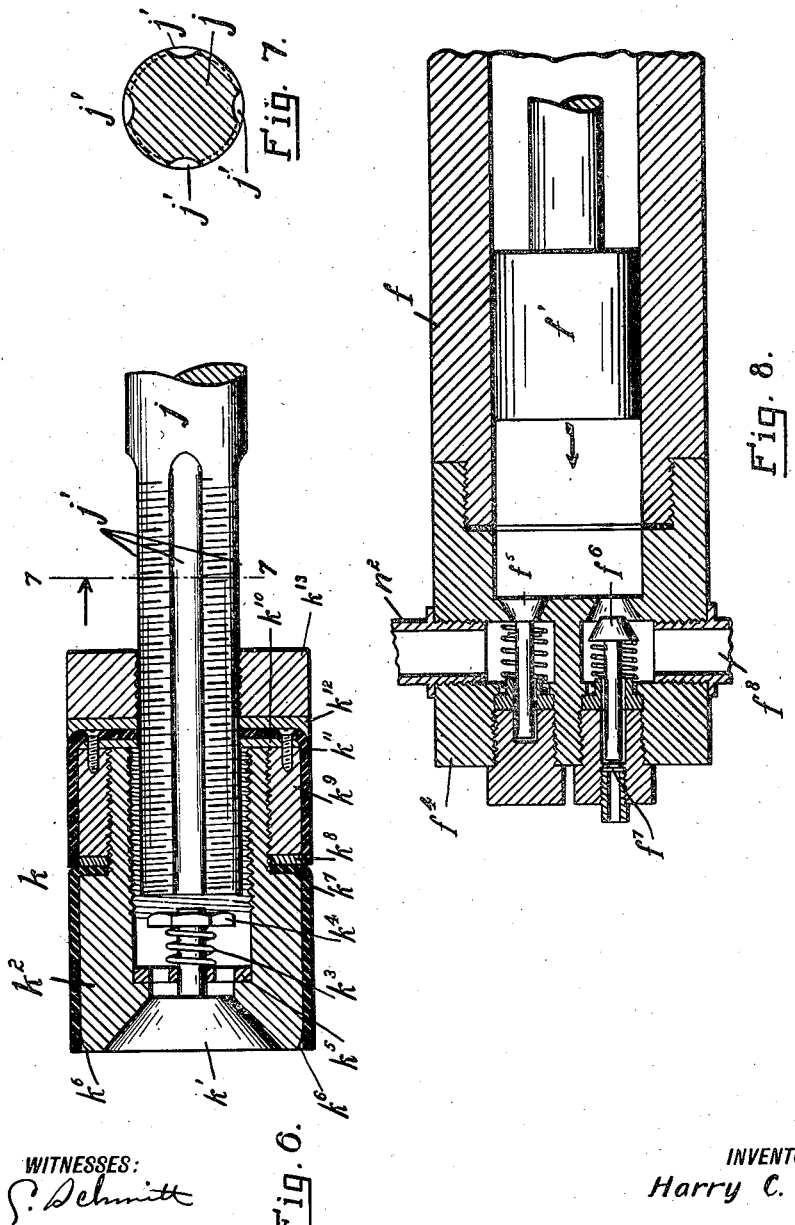

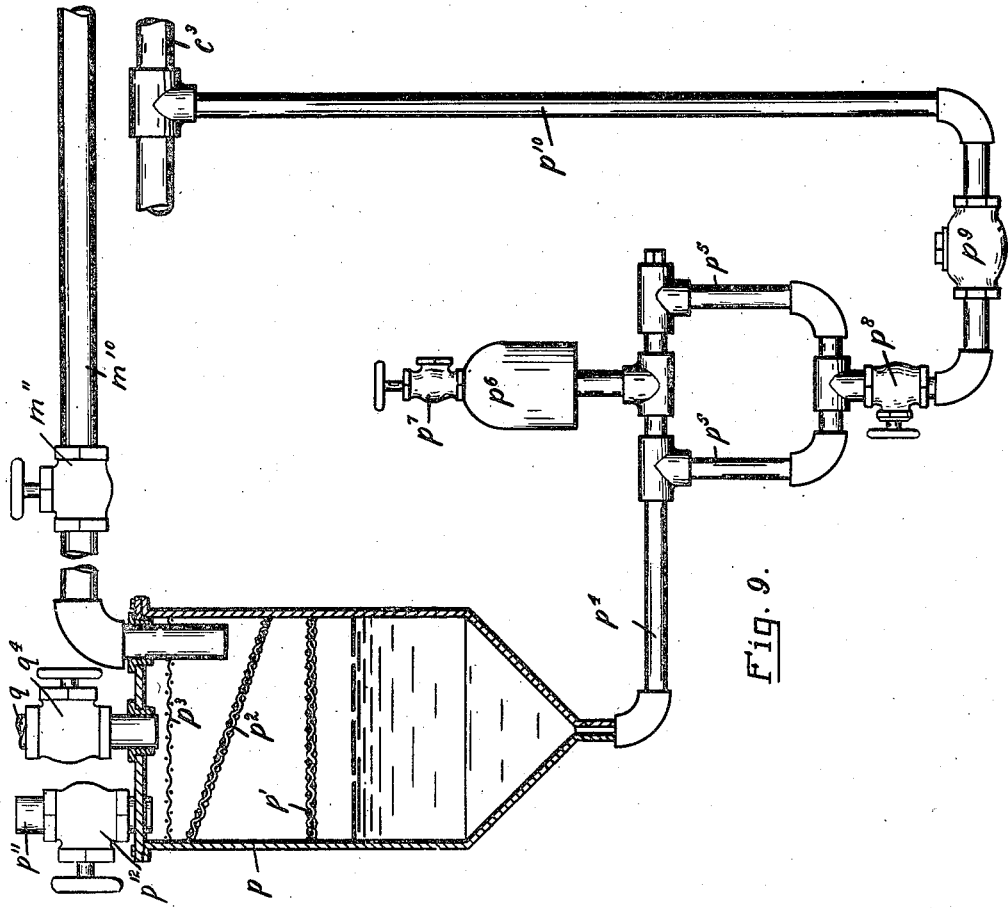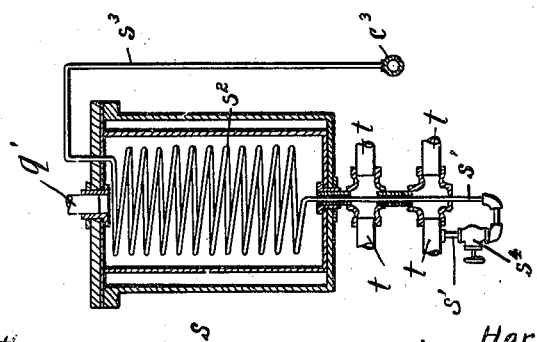

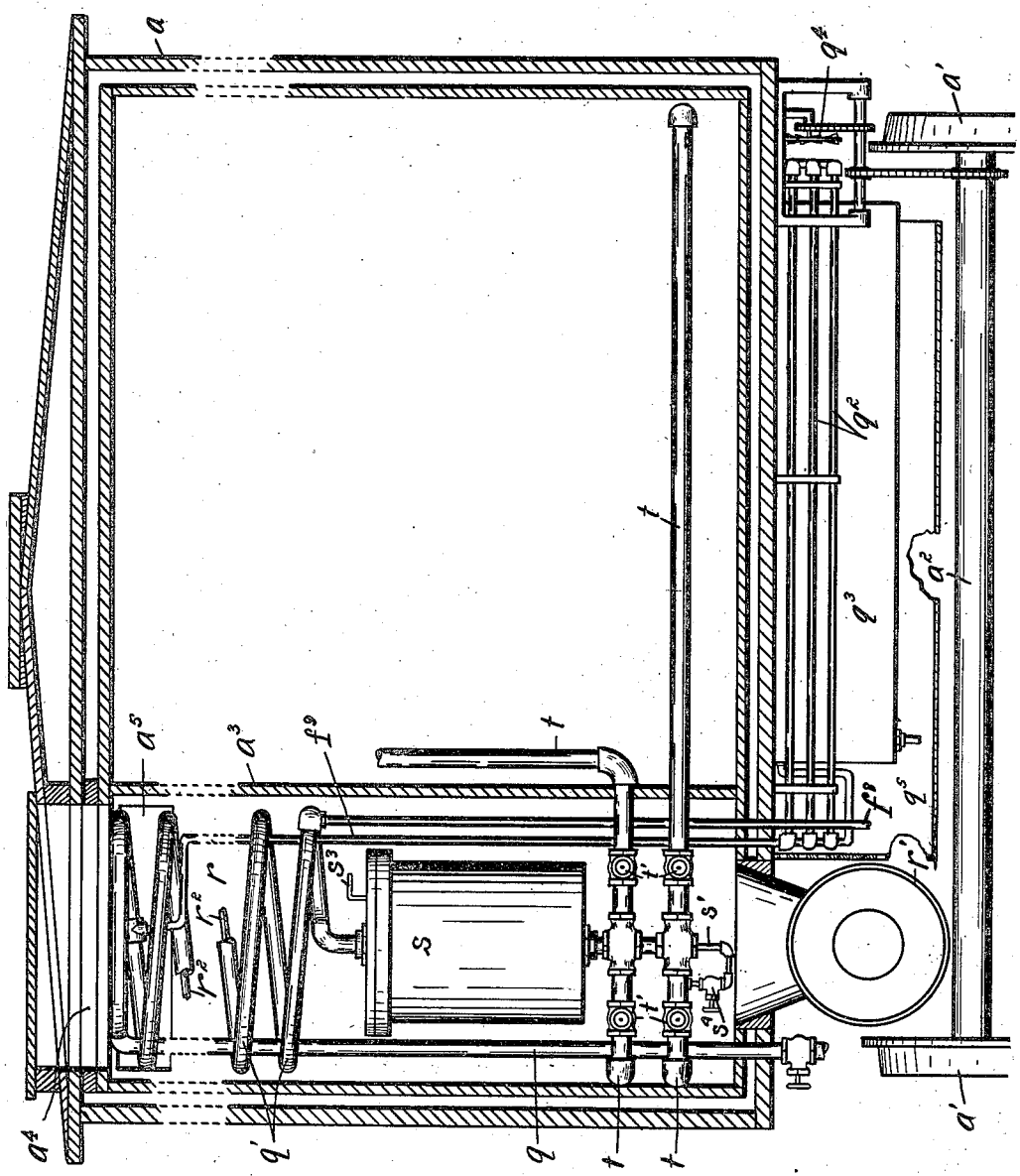

UNITED STATES PATENT OFFICE.

HARRY C. AYERST, OF PORTLAND, OREGON, ASSIGNOR TO INTERNATIONAL COOLING CO., OF PORTLAND, OREGON, A CORPORATION OF OREGON.

REFRIGERATING SYSTEM FOR CARS.

1,174,800.  Specification of Letters Patent.  Patented Mar. 7, 1916.

Application filed February 9, 1914. Serial No. 817,677.

*To all whom it may concern:*

Be it known that I, HARRY C. AYERST, a citizen of the United States, and a resident of the city of Portland, in the county of Multnomah, State of Oregon, have invented a new and useful Improvement in Refrigerating Systems for Cars, of which the following is a specification.

My invention relates to a system of refrigeration especially adapted for use in freight cars while in transit.

A commercially successful refrigeration system for the purpose mentioned must be very compact and rigid so as to resist the jars and shocks due to the car motion. Furthermore, it must be so constructed as to require a minimum of attention while in transit.

To this end the main object of my invention is to provide individual refrigerating means for each car, and to control the operation of such means automatically by thermostatic devices so arranged as to operate only when the temperature of the car has reached a predetermined maximum degree, and in this way maintaining constant refrigeration within the car.

A further object of my invention is to so arrange each car that it is an interchangeable unit of a series of cars, the refrigeration devices of each of which is controlled from one central source of electric power carried by one car, all units being connected in multiple and the energizing circuit for the refrigerating devices of each car being automatically controlled by thermostatic means provided in the car.

The details and features of my invention will be readily understood from the description hereinafter contained.

Figure 1:
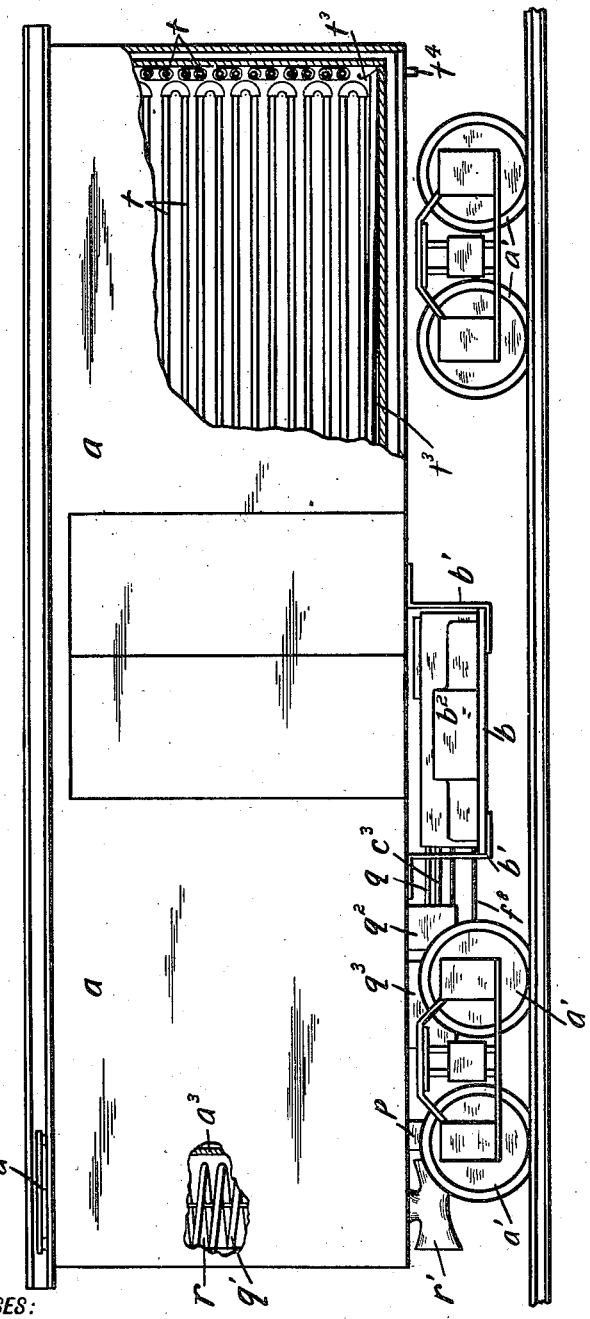
Figure 2:
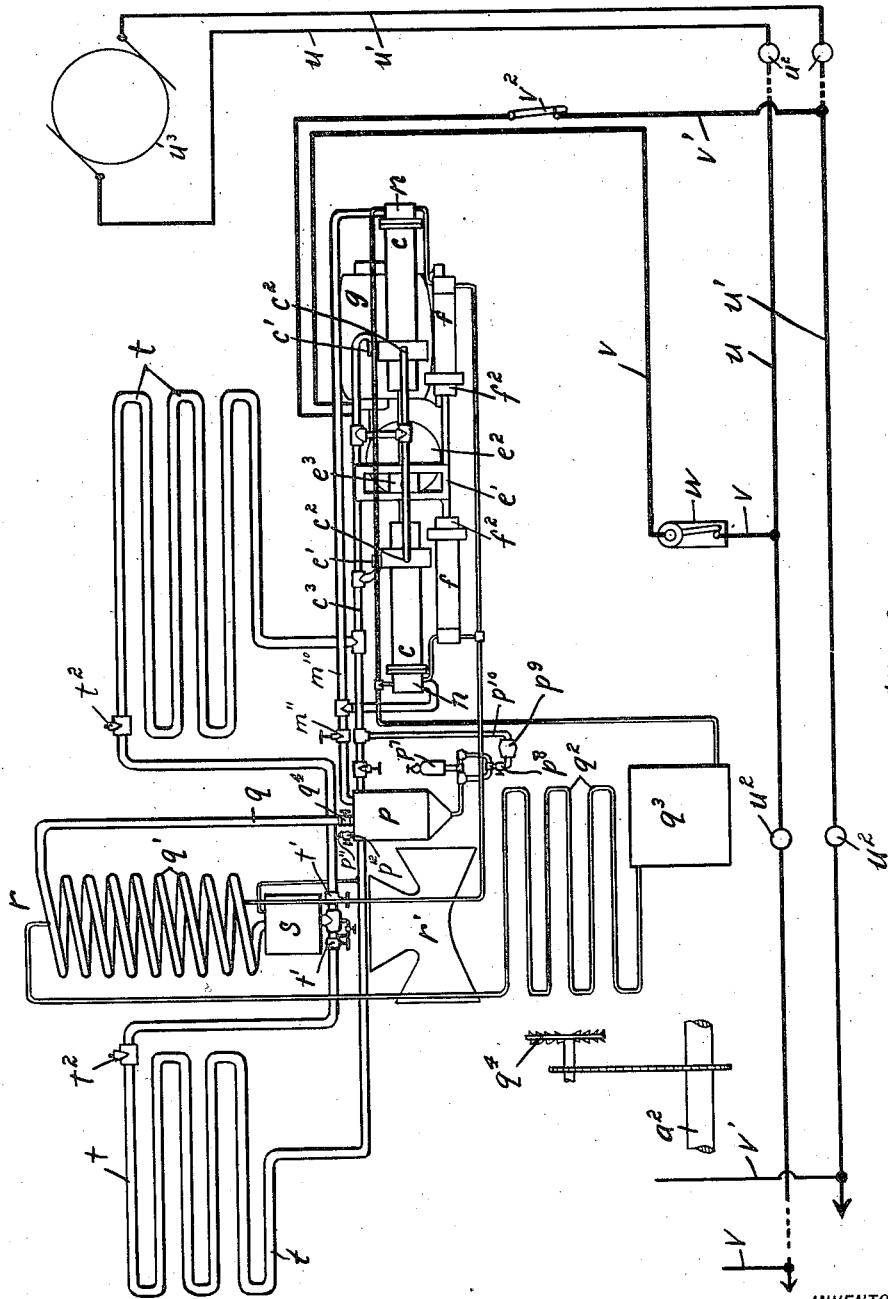
Figure 3:
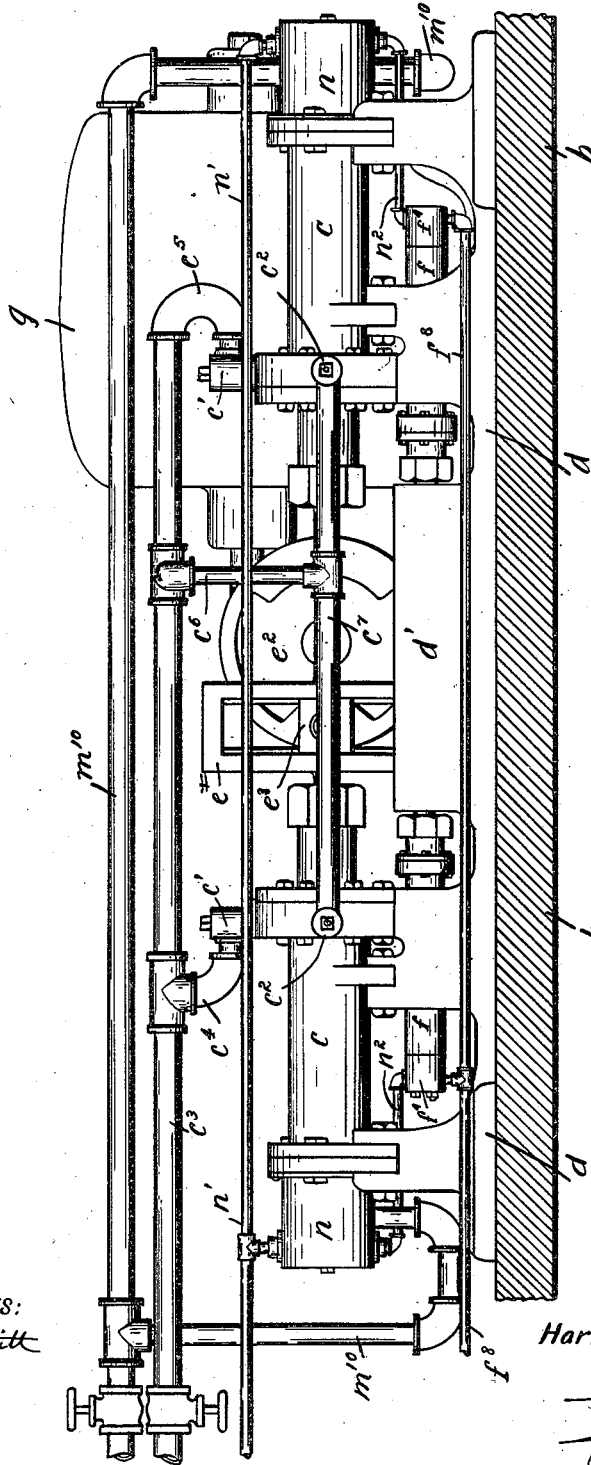
Figure 4:
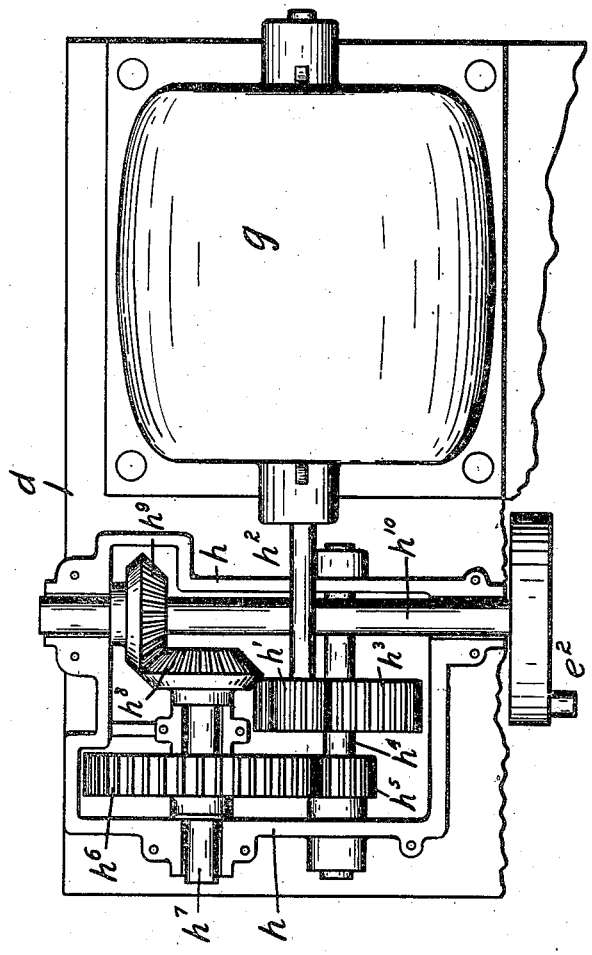

In the accompanying drawings: Figure 1 is a side elevation of a refrigerating car equipped with my apparatus; portions of the car housing are broken away so as to show the condenser and refrigerating coils; the motor and compressors are to be understood as carried in a dust-proof case suspended under the bottom of the car; Fig. 2 is a diagrammatic view showing my refrigerating apparatus complete; Fig. 3 is a side elevation of the motor-driven fluid compressor and pump supplying the water for cooling, and the connections of these devices, these parts being suspended directly beneath the floor of a car; the casing which protects these parts from the dirt and dust of the roadbed is, however, omitted from this view; Fig. 4 is a plan view of the motor and the driving connections between the same and the fluid compressors and the cooling pumps; Fig. 5 is a longitudinal vertical section of one of the fluid compressors and cooling pumps, detailing the inlet and outlet valve construction of said compressor; the moving parts are shown at the end of their working or exhaust stroke; Fig. 6 is a longitudinal, vertical section of the fluid compressor piston, showing the piston valve in the position assumed by it on the exhaust stroke; Fig. 7 is a transverse vertical section taken on the line 7—7 of Fig. 6; Fig. 8 is a detailed sectional view of the end of the water-pump, showing the intake and exhaust valves as positioned during the expelling stroke of the piston, the direction of movement of the latter being indicated by an arrow; Fig. 9 is a sectional detail of the oil separator and the connections of same with the high pressure, or exhaust, and the low pressure, or intake sides of the apparatus; Fig. 10 is a sectional detail of the liquid receiver located at the bottom of the condenser; and Fig. 11 is a transverse sectional elevation of a car in which my refrigerating apparatus is installed; the motor, the fluid compressors, and the cooling pumps are omitted in this view, as are also the continuations of the refrigerating coils and the casing of the water cooling pipes.

In the drawings, a refrigerating car of the ordinary type is represented by $a$. The walls and floor of this car are insulated in any convenient manner, for example as suggested by the construction outlined in Figs. 1 and 11. The wheels of the car are indicated by $a'$, and the axles by $a^2$ in Fig. 11. The details of the remaining portions of the car construction are not detailed because immaterial.

Suspended from the floor of the car, $a$, by the brackets, $b'$, (see Fig. 1) is a shelf $b$, which supports the fluid compressors, the pumps and the motor, all shown in assembled view in Fig. 3. A dust-proof case, $b^2$, (see Fig. 1) incloses these parts. The parts inclosed by the case, $b^2$, are shown in Figs. 3 to 8 inclusive.

The fluid compressors comprise cylinders, $c$, rigidly mounted on the base $d$, affixed on the shelf $b$. The rods $j$ of the compressor pistons, $k$, of the two cylinders are connected by a yoke $e$, which is reciprocated by the eccentric disk $e^2$. The water pumps, $f$, are also rigidly mounted on the base, $d$, in parallel alinement with the compressor cylinders $c, c$. The piston rod $f'$ of said pumps are connected to the yoke $e$, so that the compressor and the pump are driven synchronously.

A portion $d'$ of the base $d$ (see Figs. 3 and 5) is formed as an oil reservoir, in which the lower end of the yoke $e$ reciprocated, so that the lower end of the sliding block, $e^2$ will pick up a little of the lubricating oil with each revolution of the eccentric $e^2$. The motor case $g$ is rigidly mounted on the base $d$, as is also the gear case $h$ (see Figs. 3 and 4), the latter containing the right-angled reducing gear that carries the drive from the motor to the eccentric $e^2$, see Fig. 4. Said reducing gear comprises a spur gear $h'$ fixed on the end of the motor shaft $h^2$. Said gear drives a larger-sized pinion $h^3$, rigid on the shaft $h^4$, rotatably mounted in the gear case $h$. A pinion $h^5$ carries the drive to a gear $h^6$, rigid on a rotatable shaft $h^7$, also mounted in parallel alinement with the motor shaft $h^2$. A miter gear, $h^8$, rigid on the end of the shaft $h^7$, carries the drive at right angles to the miter gear $h^9$, the latter being rigid on the shaft $h^{10}$, which is rotatably mounted in the gear case at right angles to the motor shaft $h^2$. The eccentric $e^2$ is mounted on the end of the shaft $h^{10}$ and drives the yoke $e$, so as to operate the fluid compressor and water pumps, in the manner previously mentioned.

Each compressor cylinder, $c$, has two gas inlets $c'$, $c^2$. See Fig. 3. The inlets $c'$ connect directly with the fluid inlet pipe $c^3$, through the connections $c^4$, $c^5$, and said pipe $c^3$ is connected with the fluid inlets $c^2$ by the pipes $c^6$, $c^7$. Each of the inlets $c'$, $c^2$ is controlled by a valve. One of the inlet valves $c'$ is detailed in Fig. 5, and the inlet valves $c^2$ are of the same construction. The inlet head $i$ (see Fig. 5) is threaded into the head of the compressor cylinder $c$, and the connecting pipe $c^4$ is threaded into said inlet head $i$. A cone valve $i'$ is adapted to close the opening from the inlet head $i$ to the interior of the compressor cylinder $c$. This valve $i'$ is normally held closed by a coil-spring $i^2$. When the pressure in the inlet head, $i$, is greater than the pressure in the compressor cylinders, $c$, the valve $i'$ will open and admit fluid to the compressor cylinders until the pressures in the compressor cylinders is greater, whereupon the valve $i'$ will again close. The interior of the inlet head, $i$, has a safety outlet to the external atmosphere. In this outlet is formed a shoulder $i^3$ upon which is seated a copper disk $i^4$, held in place by a hollow plug $i^5$. These parts are so arranged that pressure higher than a predetermined safety point will blow out the copper disk $i^4$, and thereby prevent any damage.

One of the pistons, $k$, of the compressor cylinders is detailed in Figs. 6 and 7. The piston rod $j$ has its end threaded, and is provided with a plurality of longitudinal peripheral grooves $j'$ which are adapted to pass the incoming fluid from the rear of the piston head $k$ to the front of the latter, thence passing through a valve $k'$. Said piston head $k$ is constructed as follows: A cored-out piece $k^2$ is threaded internally to receive the threaded end of the piston rod $j$. The inner end of this piece $k^2$ is made of reduced diameter, threaded externally, and the outer end of said piece is formed with a valve seat. The valve $k'$ is held normally closed by a spring $k^3$, bearing on a nut $k^4$. A perforated washer $k^5$ serves to center the valve. The outer end of the piece $k^2$ has its edge beveled as shown at $k^6$ in Fig. 6, which allows the compressed fluid to creep under and expand the cup-leather $k^7$, when the piston is on its compressing stroke. The cup-leather $k^7$ is secured in place by a metal washer $k^8$, fitting over the threaded end of the piece $k^2$, and a bushing $k^9$ screws down tightly on said washer. A second washer $k^{10}$ bears on the alined ends of the piece $k^2$, and the bushing $k^9$. A cup-leather $k^{11}$ is firmly fastened to the bushing $k^9$ by the washer $k^{12}$, the latter being concaved at its inner surface. A lock nut $k^{13}$ secures these parts in place. The outlet end of the compressor cylinder $c$ is made with a port $m'$. See Fig. 5. A cored-out piece $m$ is made with a valve opening $m^2$, connecting with the port $m'$, and is bolted on the end of the cylinder $c$. Said piece $m$ is provided with an outlet orifice which connects with the outlet pipe $m^{10}$. Said piece $m$ is bolted rigidly on the end of the compressor cylinder $c$. A perforated washer $m^3$ bears against a shoulder of the piece $m$ and forms a guideway for the valve stem $m^4$ of the valve $m^5$. A spring $m^6$ normally holds said valve closed. A bushing $m^7$ holds the washer $m^3$ against its seat and also provides a seat for a safety blow-out valve $m^8$, held in place by the plug $m^9$, and performing the same function as the above described safety device of the inlet head $c'$ of the compressor cylinder. A water jacket, $n$, having inlet and outlet pipes $n^2$, $n'$, surrounds the entire valve casing and serves to reduce the temperature of the fluid at this point. The end of the cylinder adjacent the yoke $e$ is provided with a stuffing box $o$ and gland $o'$.

The water pump cylinder $f$ is located in the same vertical plane as the compressor cylinder $a$, and is rigidly mounted on the base $d$. The end of the pump cylinder $f$ adjacent the yoke $e$ is provided with a stuffing box $f^2$, and a gland $f^3$. The water inlet and outlet valves, $f^5$, $f^6$, are both contained in a hollow head $f^4$, which screws onto the forward end of the pump cylinder $f$, as detailed in Figs. 5 and 8. The inlet and outlet valves, $f^5$, $f^6$, respectively, control ports in said head $f^4$. Said valves $f^5$, $f^6$, act in different directions and at different times, as is obvious. The pipe $n^2$ connects with the opening of the inlet valve $f^5$. When the piston $f'$ is moving toward the left, as shown in Fig. 8, the pressure of the water will open the valve $f^6$, and close the inlet valve $f^5$. A safety plug $f^7$, similar to those shown in connection with the inlet and outlet valves of the compression cylinder, is used in connection with the outlet valve $f^6$. An outlet pipe $f^8$ connects with the outlet valve $f^6$, and carries the water from the pump to the condenser $r$. The outlet pipe $m^{10}$ of the compressor cylinder $c$ conveys the compressed fluid to an oil separator $p$ (see Figs. 2 and 9) the function of which is to separate the oil and foreign matter from the fluid before the latter enters the condenser; the oil being returned to the inlet pipe $c^3$. This separator, as detailed in Fig. 9, consists of an oil receptacle provided on its interior with two coarse screens $p'$, $p^2$, and a fine screen $p^3$, located respectively as shown in this figure. The lower end of the receptacle connects with a small pipe or conduit $p^4$, which divides the stream by causing portions thereof to flow through the branches $p^5$. An air chamber, or dome, $p^6$, and blow-out valve $p^7$, allows the air contained in the oil to be collected and discharged to the atmosphere. The branches $p^5$ unite at a lower point, and the oil flows through the needle valve $p^8$ and check valve $p^9$ into the pipe or conduit $p^{10}$ which connects with the inlet pipe $c^3$. The compressed fluid which is discharged into the oil separator, $p$, rises from the latter through the fine screen $p^3$ into a pipe $q$, which carries it to the top coil $q'$ of the condenser, $r$, (see Fig. 11), through which it flows down to the liquid receiver, $s$, which is located just above the floor of the car. The condenser, $r$, is located in one corner of the car and is partitioned off from the body of the latter as shown by $a^3$ in Figs. 1 and 11. Directly over the condenser, $r$, is a draft opening ($a^4$) to the exterior through the roof of the car, and adjacent the condenser is a draft opening ($a^5$) to the exterior through the end of the car. See Fig. 11.

The bottom of the car, beneath the condenser, is open, and a double-ended draft-producing funnel $r'$ directs the air currents through the housing of the coils of the condenser, as the car moves in either direction; at the same time ventilating the car. The water-pipe coils $r^2$ of the condenser are contained in the fluid pipe coils $q'$ and are arranged as follows: The outlet pipe $f^8$ (see Fig. 11) from the water pump $f$ (shown in Figs. 2 and 5) enters the lower coil $q'$ of the condenser $r$. The water coils $r^2$ continue upward to the top coil of the condenser, and there they connect with a return water-pipe $f^9$, outside said fluid coils. Said water pipe $f^9$ runs to the bottom of the car, traversing through a bank of cooling-coils $q^2$, inclosed in a case, thence through a water or brine tank $q^3$, for further cooling the circulating water, and from such tank $q^3$ the inlet water-pipe $n'$ carries the water back to the water pump $f$. The cooling-coils $q^2$ are preferably inclosed in a perforated house, as indicated at $q^5$. As auxiliary means for aiding the cooling of the water in the coils $q^2$, I have provided a fan $q^4$, driven by a stepped up chain drive from the axle $a^2$ of the car $a$. See Figs. 2 and 11.

A plurality of refrigerating coils, $t$, mounted on the side and end walls of the car connect directly with the bottom of the liquid fluid receiver $s$. This receiver (shown in Figs. 10 and 11) consists of a vacuum walled receptacle, thus insulated against external heat. The liquefied fluid passes into this receiver from the condenser $r$, and then flows from the receiver into the several refrigerating coils $t$. A small pipe line $s'$ taps into one of the coils $t$, and runs back into and through the receiver $s$, where it is formed as a coil $s^2$, (see Fig. 10) immersed in the liquid in the receiver $s$. Said coil $s^2$ then connects with a pipe $s^3$, which connects with the inlet pipe $c^3$ of the compressor $c$, as shown in Fig. 10. An expansion valve $s^4$ in the pipe $s'$ permits a small flow of fluid to pass into the pipe $s^2$ in which it expands and gasifies and in so doing further cools the liquid in the receiver $s$.

The flow through each of the refrigerating coils $t$ is controlled by a screw adjusted expansion valve $t'$. Furthermore, a safety blow-out valve, $t^2$, (see Fig. 2) similar to those used in the inlet and outlet of the compression cylinders, is located at some convenient point on each refrigerating coil. The lower pressure ends of the refrigerating coils, $t$, connect directly with the inlet pipe $c^3$ of the fluid compressor which conducts the expanded gasified fluid back to the compressor cylinders $c$. Under each bank of refrigerating coils, $t$, is a drip pan $t^3$, which carries the drip from the pipes to a drain pipe $t^4$. See Fig. 1.

The motor, $g$, of each car, $a$, as shown in Fig. 3, is connected in multiple with main circuit wires, $u$, $u'$, by wires $v$, $v'$. See Fig. 2. A switch $v^2$, normally closed, in the line of the wire $v'$ permits that particular car to be cut out of the energizing circuit when so desired. In the line of the wire, $v$, is a thermostat, $w$, which automatically closes the circuit of the motor $g$, when the temperature of the car has reached a predetermined maximum degree, and reopens said circuit when the temperature of the car reaches a predetermined minimum. The terminals at both ends of the circuit wires $u$, $u'$ are adapted to be readily connected and disconnected by convenient means, with contiguous car units of a train, or to a source of power at the station, as at $u^2$. The source of electric power may be conveniently provided with a dynamo $u^3$ on the engine of the train.

As an auxiliary feature in connection with the oil separator, $p$, I have provided a pipe, $p^{11}$, connecting the upper interior portion of the oil separator with the atmosphere, and closed by a valve $p^{12}$. See Fig. 9. By closing the valves, $m^{11}$ and $q^4$, the oil separator will be entirely cut out of communication with the rest of the refrigerating apparatus. By opening the valve $p^{12}$ the excess pressure in the separator may be reduced and when desired fresh oil may be poured into the separator through the pipe $p^{11}$.

I claim:

1. In an apparatus of the character described including a condenser, and means for circulating the fluid through the condenser, the combination with the outlet and inlet of said means, of an oil separator located between said outlet and inlet, the outlet being connected with the top and the inlet connected with the bottom of said separator; a screen between the inlet and the outlet of the separator; a conduit from the oil separator to the condenser and an air dome provided with a valve controlled exhaust, said air dome located between the outlet of said oil separator and the inlet of the fluid circulating means.

2. In an apparatus of the character described, including a condenser and means for circulating the fluid through the condenser; the combination with the outlet and inlet of said means, of an oil separator located between said outlet and inlet; the outlet being connected with the top, and the inlet with the bottom of said separator; a screen between the inlet and the outlet of the separator; a conduit from the oil separator to the condenser, a valve element included in said conduit, an air dome provided with a valve, said air dome located between the outlet of said oil separator and inlet of the fluid circulating means.

3. In an apparatus of the character described including a condenser, and means for circulating the fluid within the condenser, the combination with the outlet and inlet of said means, of an oil separator located between said outlet and inlet, the outlet being connected with the top and the inlet connected with the bottom of said separator; a screen between the inlet and the outlet of the separator; a conduit from the oil separator to the condenser; a valve element included in said conduit; an air dome provided with a valve controlled exhaust, said air dome located between the outlet of said oil separator and the inlet of the fluid circulating means; and branch pipes connecting both sides of said air dome with said inlet.

4. In an apparatus of the character described including a condenser, and means for circulating the fluid within the condenser, the combination with the outlet and inlet of said means, of an oil separator located between said outlet and inlet, the outlet being connected with the top and the inlet connected with the bottom of said separator; a screen between the inlet and the outlet of the separator; a conduit from the oil separator to the condenser; an air dome provided with a valve controlled exhaust, said air dome located between the outlet of said oil separator and the inlet of the fluid circulating means; and a valve element controlling the passage of the fluid from said separator to inlet.

5. In an apparatus of the character described including a condenser, and means for circulating the fluid within the condenser, the combination with the outlet and inlet of said means, of an oil separator located between said outlet and inlet, the outlet being connected with the top and the inlet connected with the bottom of said separator; a screen between the inlet and the outlet of the separator; a conduit from the oil separator to the condenser; an air dome provided with a valve controlled exhaust, said air dome located between the outlet of said oil separator and the inlet of the fluid circulating means; branch pipes connecting both sides of said air dome with said inlet; and a valve element located below said branch pipes for controlling the passage of the fluid from said separator to inlet.

6. In an apparatus of the character described including a condenser, and means for circulating the fluid within the condenser, the combination with the outlet and inlet of said means, of an oil separator located between said outlet and inlet, the outlet being connected with the top and the inlet connected with the bottom of said separator; a screen between the inlet and the outlet of the separator; a conduit from the oil separator to the condenser; an air dome provided with a valve controlled exhaust, said air dome located between the outlet of said oil separator and the inlet of the fluid circulating means; branch pipes connecting both sides of said air dome with said conduit; and a valve and a check valve located in respective order below said branch pipes for controlling the passage of fluid through said inlet.

7. In an apparatus of the character described including a condenser, and means for circulating the fluid within the condenser, the combination with the outlet and inlet of said means, of an oil separator located between said outlet and inlet, the outlet being connected with the top and the inlet connected with the bottom of said separator; a conduit from the oil separator to the condenser, a valve element included in said conduit; and a valve and a check valve controlling the passage of fluid through said inlet, a valve in the inlet connection of oil separator; a pipe leading to the atmosphere on such oil separator, such pipe adapted for introducing oil into the oil separator, and a valve in such pipe.

8. In an apparatus of the character described including a condenser, and means for circulating the fluid within the condenser, the combination with the outlet and inlet of said means, of an oil separator located between said outlet and inlet, the outlet being connected with the top and the inlet connected with the bottom of said separator, a screen or filter between the inlet and the outlet connections of the separator, a conduit from the oil separator to the condenser, a valve in said conduit, and a valve in the connection between the oil separator and the outlet of said circulating means, said valves adapted for cutting out the oil separator from the remainder of the apparatus, a pipe leading to the atmosphere on such oil separator, such pipe adapted for introducing oil into the oil separator, and a valve in such pipe.

HARRY C. AYERST.

Witnesses:
Wm. C. Schmitt,
Cecil Long.